United States Patent
Camali et al.

(10) Patent No.: US 12,157,141 B2
(45) Date of Patent: *Dec. 3, 2024

(54) SYSTEM AND METHOD FOR MAKING AND APPLYING A NON-PORTLAND CEMENT-BASED MATERIAL

(71) Applicant: En-Tech Corporation, Closter, NJ (US)

(72) Inventors: Eugene James Camali, Bellair Shores, FL (US); Andreas Schrell, Hofheim (DE); Robert George Benz, Cranford, NJ (US)

(73) Assignee: EN-TECH CORPORATION, Closter, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,059

(22) Filed: Jun. 8, 2022

(65) Prior Publication Data
US 2022/0298070 A1    Sep. 22, 2022

Related U.S. Application Data

(60) Division of application No. 17/229,008, filed on Apr. 13, 2021, now Pat. No. 11,745,215, which is a
(Continued)

(51) Int. Cl.
*B05D 1/02* (2006.01)
*B28C 9/04* (2006.01)
(Continued)

(52) U.S. Cl.
CPC ............. *B05D 1/02* (2013.01); *B28C 9/0463* (2013.01); *C04B 7/14* (2013.01); *C04B 7/153* (2013.01);
(Continued)

(58) Field of Classification Search
None
See application file for complete search history.

(56) References Cited

U.S. PATENT DOCUMENTS

| 991,894 | A | 5/1911 | Akeley |
| 2,700,535 | A | 1/1955 | Harrington |

(Continued)

FOREIGN PATENT DOCUMENTS

| CN | 1693632 A | 11/2005 |
| CN | 102648167 A | 8/2012 |

(Continued)

OTHER PUBLICATIONS

Non-Final Office Action issued in related U.S. Appl. No. 17/229,008 on Jun. 13, 2022.
(Continued)

*Primary Examiner* — Michael P. Rodriguez
(74) *Attorney, Agent, or Firm* — Mark H. Whittenberger; Holland & Knight LLP

(57) ABSTRACT

A system and method for applying a construction material is provided. The method may include mixing blast furnace slag material, geopolymer material, alkali-based powder, and sand at a mixing device to generate a non-Portland cement-based material. The method may also include transporting the non-Portland cement-based material from the mixing device, through a conduit to a nozzle and combining the transported non-Portland cement-based material with water at the nozzle to generate a partially liquefied non-Portland cement-based material. The method may further include pneumatically applying the partially liquefied non-Portland cement-based material to a surface.

9 Claims, 3 Drawing Sheets

Related U.S. Application Data continuation of application No. 15/856,857, filed on Dec. 28, 2017, now Pat. No. 11,008,253, which is a division of application No. 14/705,534, filed on May 6, 2015, now Pat. No. 9,896,379.

(51) Int. Cl.
- *C04B 7/14* (2006.01)
- *C04B 7/153* (2006.01)
- *C04B 14/14* (2006.01)
- *C04B 28/00* (2006.01)
- *C04B 111/00* (2006.01)

(52) U.S. Cl.
CPC ............ *C04B 7/1535* (2013.01); *C04B 14/14* (2013.01); *C04B 28/006* (2013.01); *C04B 2111/00155* (2013.01); *Y02P 40/10* (2015.11); *Y02W 30/91* (2015.05)

(56) References Cited

U.S. PATENT DOCUMENTS

| | | | | |
|---|---|---|---|---|
| 3,107,901 | A | * | 10/1963 | Zimmerman ......... B28C 9/0454 366/5 |
| 4,066,471 | A | | 1/1978 | Burke |
| 4,106,111 | A | * | 8/1978 | Rose ................. B01F 25/31242 366/124 |
| 4,239,397 | A | * | 12/1980 | Sandell .................. B28C 5/408 427/427 |
| 4,299,761 | A | | 11/1981 | Emmons |
| 4,349,386 | A | | 9/1982 | Davidovits |
| 4,401,696 | A | | 8/1983 | Wood |
| 4,472,199 | A | | 9/1984 | Davidovits |
| 5,342,595 | A | | 8/1994 | Davidovits et al. |
| 5,366,547 | A | | 11/1994 | Brabston |
| 5,976,241 | A | | 11/1999 | Kim et al. |
| 6,641,658 | B1 | | 11/2003 | Dubey |
| 11,008,253 | B2 | | 5/2021 | Camali et al. |
| 11,224,894 | B2 | | 1/2022 | Camali |
| 2008/0153942 | A1 | | 6/2008 | Juarez |
| 2011/0132230 | A1 | | 6/2011 | Tan et al. |
| 2011/0259245 | A1 | | 10/2011 | Sperisen et al. |
| 2012/0048147 | A1 | | 3/2012 | Gehrig et al. |
| 2012/0152152 | A1 | | 6/2012 | Yin et al. |
| 2012/0156381 | A1 | | 6/2012 | Allouche et al. |
| 2012/0247369 | A1 | | 10/2012 | Ellenrieder et al. |
| 2013/0319294 | A1 | * | 12/2013 | Gehrig .................... C04B 28/18 106/695 |
| 2014/0264140 | A1 | * | 9/2014 | Gong .................... C04B 28/006 106/676 |
| 2014/0305342 | A1 | | 10/2014 | Perez-Pena |
| 2015/0232385 | A1 | | 8/2015 | Beraldo et al. |
| 2016/0326052 | A1 | | 11/2016 | Camili et al. |
| 2017/0073269 | A1 | | 3/2017 | Camali et al. |

FOREIGN PATENT DOCUMENTS

| | | |
|---|---|---|
| CN | 203796282 U | 8/2014 |
| CN | 104016633 A | 9/2014 |
| CN | 104254504 A | 12/2014 |
| CN | 108025970 A | 5/2018 |
| DE | 3623631 C1 | 8/1987 |
| EP | 0352583 A2 | 1/1990 |
| EP | 2428499 A1 | 3/2012 |
| JP | 859-30747 A | 2/1984 |
| JP | H0492844 A | 3/1992 |
| JP | H10-25138 A | 1/1998 |
| JP | 2010-280532 A | 12/2010 |
| JP | 2013537163 A | 9/2013 |
| RU | 2235077 C2 | 8/2004 |
| WO | 2011003918 A1 | 1/2011 |
| WO | 2011/064005 A1 | 6/2011 |
| WO | 2013163009 A1 | 10/2013 |
| WO | 2015049010 A1 | 4/2015 |
| WO | 2015111860 A1 | 7/2015 |
| WO | 2016179361 A1 | 11/2016 |

OTHER PUBLICATIONS

Office Action issued in Japan Application No. JP 2017-568460 on Aug. 28, 2018.
Decision of Rejection issued in Chinese Application Serial No. 201680039707.0 on Dec. 5, 2019.
Notice of Allowance issued in related U.S. Appl. No. 16/691,763 on Jun. 3, 2021.
Notice of Allowance issued in related U.S. Appl. No. 16/691,915 on Sep. 8, 2021.
Corrected Notice of Allowance issued in related U.S. Appl. No. 16/691,915 on Sep. 22, 2021.
Notice of Allowance issued in related U.S. Appl. No. 16/691,763 on Sep. 24, 2021.
Notification of Reexamination issued on Oct. 21, 2021 in related Chinese Application Serial No. 2021101801240330.
Second Office Action issued in CN Application No. 202110270244450 dated Nov. 1, 2021.
Examination Report No. 1 issued on Sep. 4, 2021 in related Australian Application Serial No. 2016428605.
Notice of Allowance issued Nov. 16, 2021 in related Taiwanese Patent Application No. 105136165.
Corrected Notice of Allowance issued in related U.S. Appl. No. 16/691,915 dated Dec. 15, 2021.
Chinese Office Action issued on Dec. 7, 2022 in related application Serial No. 202210872307.5.
New Zealand Examination Report issued in related Application Serial No. 775779 on Jan. 18, 2023.
Final Office Action issued in U.S. Appl. No. 14/705,534 on May 5, 2017.
Non-Final Office Action issued in U.S. Appl. No. 14/705,534 on Sep. 13, 2016.
Höfler et al. "Shotcrete in Tunnel Construction—Introduction to the basic technology of sprayed concrete" Putzmeister AG, Mar. 2004.
First Examination Report issued in NZ App. No. 737459 on Dec. 20, 2017.
Canadian Office Action issued in CA Application No. 2,985,199 on Dec. 1, 2017.
International Search Report issued in International App. No. PCT/US2016/060639 on Feb. 17, 2017.
International Search Report issued in International App. No. PCT/US2016/030920 on Aug. 8, 2016.
Buchwald, Anja. "What are Geopolymers? Current State of Research and Technology, the Opportunities they Offer, and their Significance for the Precast Industry", BFT Jul. 2006, Concrete Technology, pp. 42-49.
Weil, Marcel. "Geopolymer Binders—Ecological and Economic Analyses of Geopolymer Concrete", BFT Dec. 2011 (www.bft-international.com) pp. 4-17 (2011).
"Milliken's Geopolymer Products" webpage (http://geopolymers.milliken.com/Pages/products.aspx), 2 pages (accessed on May 6, 2015).
Final Office Action issued in U.S. Appl. No. 15/344,062 on Aug. 21, 2019.
Non-Final Office Action issued in U.S. Appl. No. 15/344,062 on Feb. 8, 2019.
Extended European Search Report issued in EP Application No. 16790067.9 on Nov. 14, 2018.
Sofi et al., "Engineering properties of inorganix polymer concretes (IPCs)". Cement and Concrete Resea, Pergamon Press, vol. 37, No. 2, Jan. 30, 2007.
Second Office Action issued in CN Application Serial No. 201680039707.0 on Apr. 28, 2019.
Non-Final Office Action issued in U.S. Appl. No. 15/856,857 on Jun. 24, 2019.
Office Action issued in JP Application No. 2017-568460 on May 1, 2018.

(56) References Cited

OTHER PUBLICATIONS

Decision to Grant in RU Application No. 2017138391 on May 3, 2018.
Examination Report in CN Application No. 201680039707.0 on Sep. 6, 2018.
Non-Final Office Action issued in U.S. Appl. No. 16/383,030 on Oct. 4, 2019.
Official Action issued in related Taiwanese Application No. 105114117 on Oct. 15, 2019.
Non-Final Office Action issued in U.S. Appl. No. 15/344,062 on Feb. 21, 2020.
Final Office Action issued in related U.S. Appl. No. 15/856,857 on Mar. 6, 2020.
Official Action issued in related Russian Application No. 2019117051 on Feb. 7, 2020.
Communication Pursuant to Article 94(3) issued in related EP Application No. 16790067.9 on Mar. 2, 2020.
Supplementary Extended Search Report issued in related EP Application No. 16920601.8 on Mar. 18, 2020.
Examination Report No. 1 issued in counterpart Australian Divisional Patent Application No. 2019284021 on Jul. 17, 2020.
Final Office Action issued in U.S. Appl. No. 16/383,030 on Jun. 15, 2020.
Notice of Allowance issued in related U.S. Appl. No. 15/344,062 on Aug. 21, 2020.
Non-Final Office Action issued in U.S. Appl. No. 15/856,857 on Sep. 4, 2020.
Decision of Grant together with Report on Results of Examination issued in counterpart Russian Patent Application No. 2019117051 on Jul. 29, 2020.
Notice of Allowance issued in related U.S. Appl. No. 16/383,030 on Sep. 18, 2020.
Non-Final Office Action issued in U.S. Appl. No. 16/691,763 on Oct. 6, 2020.
Non-Final Office Action issued in U.S. Appl. No. 16/691,892 on Oct. 6, 2020.
Non-Final Office Action issued in U.S. Appl. No. 16/691,915 on Oct. 6, 2020.
Communication Pursuant to Article 94(3) EPC in related European Patent Application No. 16790067.9 mailed Nov. 23, 2020 4 pages.
Japanese Official Action issued in related Japanese Application No. 2019-523804 on Nov. 25, 2020.
Notice of Allowance issued in related U.S. Appl. No. 15/856,857 on Jan. 13, 2021; 16 pages.
Final Office Action issued in related U.S. Appl. No. 16/691,892 on May 13, 2021.
First Examination Report issued in India Application No. 201917020529 on Dec. 23, 2020.
Examination Report issued in India Application No. 201717041554 on May 9, 2019.
Examination Report No. 1 in Australia Application No. 2019284021 on Jul. 17, 2020.
Russian Official Action issued on Feb. 7, 2020 in related application Serial No. 2019117051.
Chekhov, A. P. et al. Handbook of concretes and solutions, Kiev, Budivelnik, 1972, p. 31.
Examination Report issued in European Application No. 16920601.8 on Mar. 4, 2021.
Notice of Allowance issued in related U.S. Appl. No. 14/705,534 on Sep. 29, 2017.
Office Action issued in Taiwan Application Serial No. 105136165 on Mar. 8, 2021.
Office Action issued in Chinese Application Serial No. 201680091884.3 on Apr. 15, 2021.
Search Report issued in European Application No. 20207927.3 on Apr. 1, 2021.
Examination Report No. 1 issued in counterpart Australian Divisional Patent Application No. 2018201673 on Dec. 21, 2018.
Non-Final Office Action issued in related U.S. Appl. No. 17/229,008 on Dec. 22, 2022.
Chinese Second Office Action issued in related Application Serial No. 202210872307.5 on May 25, 2023.
Office Action cited in related Chinese Application Serial No. 202210872307.5 dated Apr. 16, 2024.
Intention to grant Office Action issued in European Application Serial No. 16790067.9 on Jul. 1, 2024.
Notice of Allowance related New Zealand Application Serial No. 781905 dated Jul. 17, 2024.
Notice of Allowance related New Zealand Application Serial No. 781909 dated Jul. 12, 2024.
Notice of Allowance related New Zealand Application Serial No. 781911 dated Jul. 17, 2024.
Office Action related New Zealand Application Serial No. 781909 dated Mar. 12, 2024.
New Zealand Patent Patent Examination Report 2 issued in the related Application Serial No. 753356 on Jan. 15, 2024.
Office Action related Chinese Application Serial No. 202210872307.5 dated Nov. 8, 2023.
Office Action related New Zealand Application Serial No. 781905 dated Mar. 19, 2024.
Office Action related New Zealand Application Serial No. 781911 dated Mar. 19, 2024.

* cited by examiner

SYSTEM AND METHOD FOR MAKING AND APPLYING A NON-PORTLAND CEMENT-BASED MATERIAL

RELATED CASES

This is a divisional of U.S. patent application Ser. No. 17/229,008, filed 13 Apr. 2021, which is a continuation of U.S. patent application Ser. No. 15/856,857, filed 28 Dec. 2017, which is a divisional of U.S. patent application Ser. No. 14/705,534 filed on 6 May 2015, now U.S. Pat. No. 9,896,379, Issued Feb. 20, 2018, entitled System and Method for Making and Applying a Non-Portland Cement-Based Material, the contents of which are all incorporated by reference.

TECHNICAL FIELD

This disclosure relates to construction materials and, more particularly, to a method for making and applying construction materials.

BACKGROUND

Existing approaches in the fields of sewer refurbishing and concrete restoration may involve the application of shotcrete, which may be pneumatically projected towards the surface in need of repair. This shotcrete includes materials found in basic concrete, such as, sand, Portland cement, and water. At a particular job site, this shotcrete may take the form of either a dry-mix or a wet-mix application. The phrase "dry-mix" typically involves the pneumatic transfer of some or all of the materials in a dry state, through a hose, to a nozzle where an operator may control the application of water to the dry-mix at the nozzle prior to the projection of the substance. In contrast, the phrase "wet-mix" typically involves the transfer of a previously mixed concrete, including water, through a hose prior to projection.

Some companies have attempted to alter the material composition of the shotcrete in order to obtain certain benefits. Accordingly, some approaches may involve the use of geopolymers. However, these materials are often subject to corrosion as a result of the organic material inherent in these products. For example, Milliken® manufactures various products under their GeoSpray™ and GeoSpray™ AMS line of products. The AMS product may be applied as a pre and/or post-treatment to the GeoSpray™ product. GeoSpray is Portland cement-based and contains only a small portion of a geopolymer. This mixture is not acid stable. AMS contains organics to combat the effects of acids on Portland cement based concrete and of organics and microbial induced corrosion that happens with Portland cement based coatings.

SUMMARY OF DISCLOSURE

In a first implementation, a method for applying a construction material is provided. The method may include mixing blast furnace slag material, geopolymer material, alkali-based powder, and sand at a mixing device to generate a non-Portland cement-based material. The method may also include transporting the non-Portland cement-based material from the mixing device, through a conduit to a nozzle and combining the transported non-Portland cement-based material with water at the nozzle to generate a partially liquefied non-Portland cement-based material. The method may further include pneumatically applying the partially liquefied non-Portland cement-based material to a surface.

One or more of the following features may be included. In some embodiments, the geopolymer material is at least one of volcano rock flour and fly ash. The alkali-based powder may include silicate. Mixing may be performed as a dry-mix. The non-Portland cement-based material may be inorganic. Mixing may be performed at a mobile sewer refurbishing vehicle. The non-Portland cement-based material may include at least one of clay, gneiss, granite, liparite, andesite, picrite, potassic feldspar, albite, pumice and zeolite. Mixing may include mixing at a portable gun, which is configured to receive the non-Portland cement-based material from the mixing device. The components of the non-Portland cement-based material may include a Blaine fineness value of approximately 3500 $cm^2/g$.

In another implementation, a system for applying a construction material is provided. The system may include a mixing device configured to mix blast furnace slag material, geopolymer material, alkali-based powder, and sand to generate a non-Portland cement-based material. The system may also include a conduit configured to transport the non-Portland cement-based material from the mixing device. The system may further include a nozzle configured to receive the non-Portland cement-based material and combine the transported non-Portland cement-based material with water to generate a partially liquefied non-Portland cement-based material, wherein the nozzle is further configured to pneumatically apply the partially liquefied non-Portland cement-based material to a surface.

One or more of the following features may be included. In some embodiments, the geopolymer material may be at least one of volcano rock flour and fly ash. The alkali-based powder may include silicate. Mixing may be performed as a dry-mix. The non-Portland cement-based material may be inorganic. Mixing may be performed at a mobile sewer refurbishing vehicle. The non-Portland cement-based material may include at least one of clay, gneiss, granite, liparite, andesite, picrite, potassic feldspar, albite, pumice and zeolite. Mixing may include mixing at a portable gun, which is configured to receive the non-Portland cement-based material from the mixing device. The components of the non-Portland cement-based material may include a Blaine fineness value of approximately 3500 $cm2/g$.

In another implementation, a non-Portland cement-based construction material is provided. The non-Portland cement-based construction material blast furnace slag material, volcano rock flour, alkali-based powder, and sand. In some embodiments, the alkali-based powder may be silicate.

The details of one or more implementations are set forth in the accompanying drawings and the description below. Other features and advantages will become apparent from the description, the drawings, and the claims.

DETAILED DESCRIPTION OF THE EMBODIMENTS

Embodiments of the present disclosure are directed towards a construction material having an alkali-activated binder (i.e. non-Portland cement based) and a system and method for making and applying the same. Although many of the examples included herein are discussed in the context of concrete rehabilitation it should be noted that the construction material described herein may be used in any suitable application. Some of these may include, but are not limited to, sewer rehabilitation projects, paint spray gun applications, onsite mobile batch plants, any concrete structure undergoing an acid attack, etc.

Figure 1:
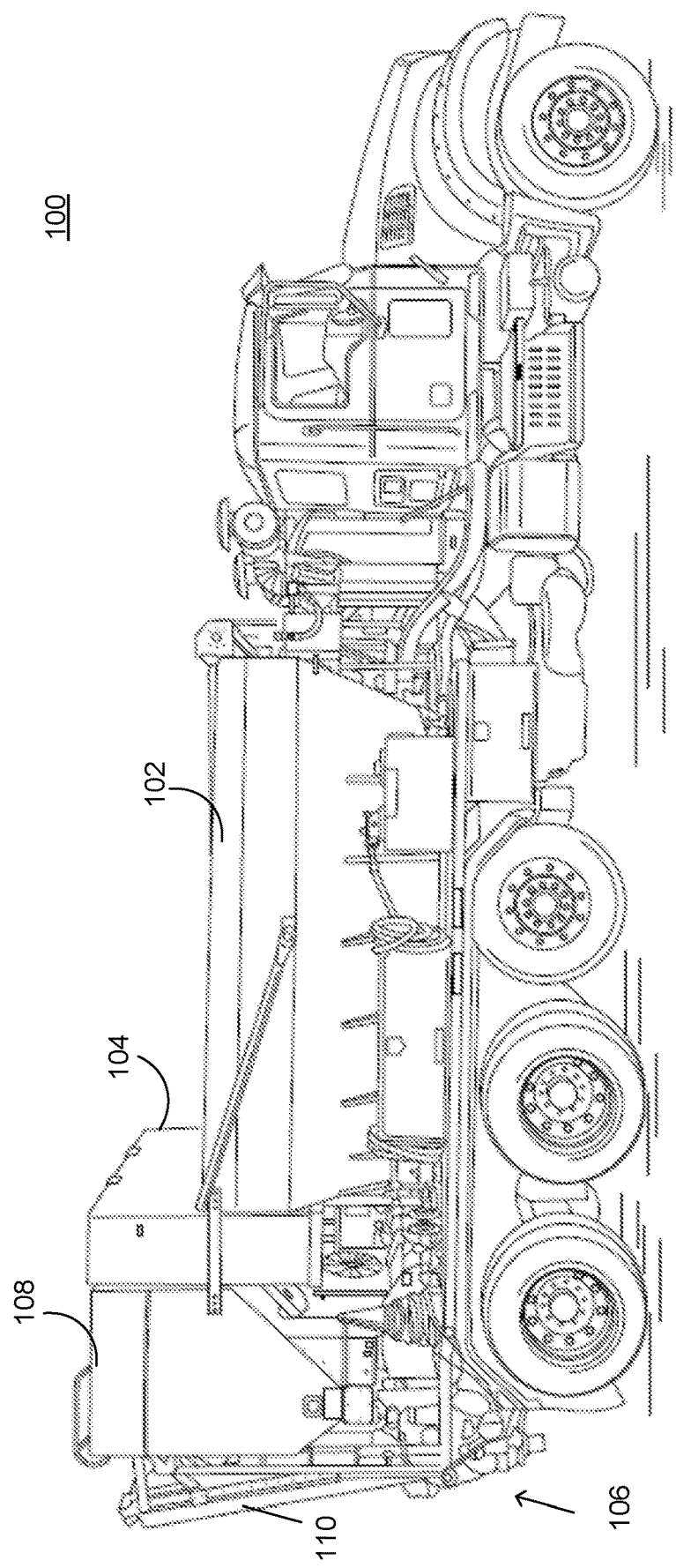
FIG. 1 is a side view of a mobile system configured to apply a non-cement-based material according to an embodiment of the present disclosure.
Figure 2:
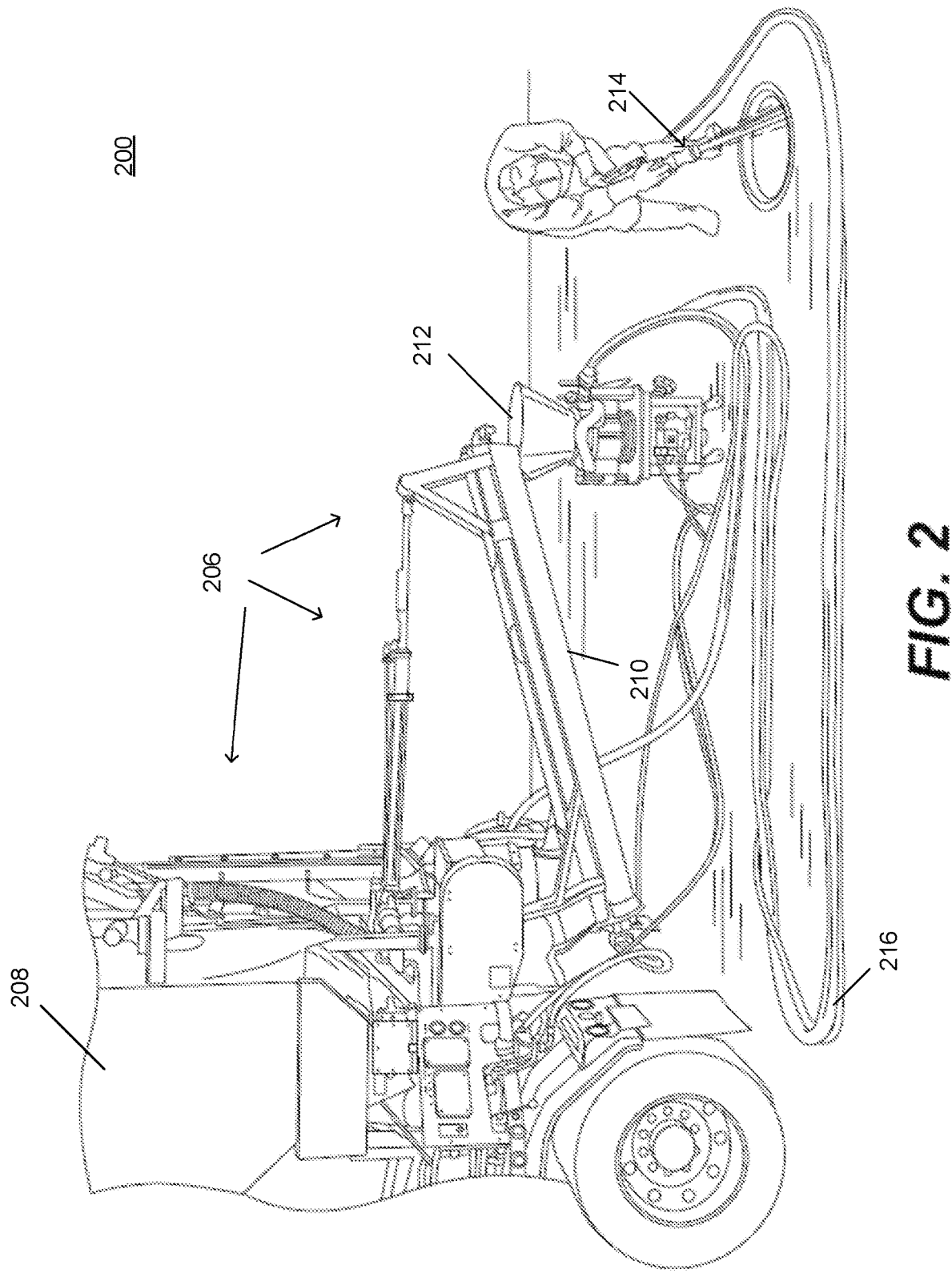
FIG. 2 is a side rear view of a mobile system configured to apply a non-cement-based material according to an embodiment of the present disclosure.
Figure 3:
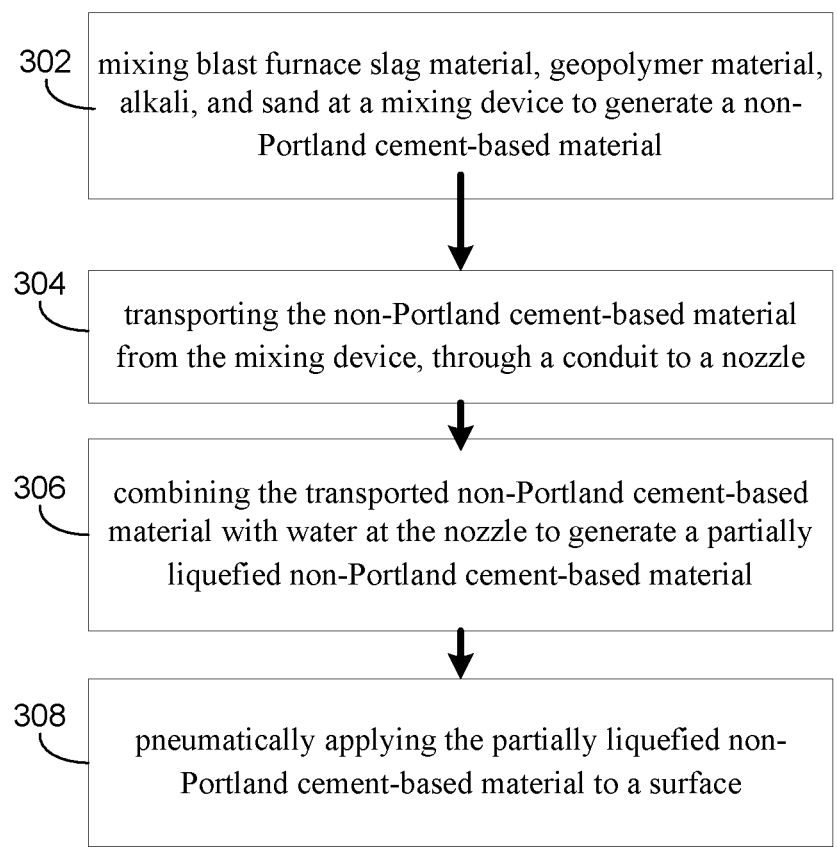
FIG. 3 is a flowchart depicting operations consistent with a non-cement-based application process according to an embodiment of the present disclosure.

Referring to FIG. 1, there is shown a mobile sewer refurbishing vehicle 100 having a number of containers, compartments, and devices associated therewith. In some embodiments, vehicle 100 may include first container 102, which may be configured to store sand or other materials. Storage unit 104 may be configured to store water or other liquids. Vehicle 100 may further include a mixing device 106, which may include a number of components, some of which may include, but are not limited to, second container 108, adjustable delivery mechanism 110, and portable gun 212. As is shown in FIG. 2, portable gun 212 may be connected to nozzle 214 via conduit or hose 216.

In some embodiments, mobile sewer refurbishing vehicle 100 may be configured to mix and apply a non-Portland cement-based construction material. This material may be mixed at the vehicle (e.g. within mixing device 106) or prior to being placed within second container 108. This material may be transported to nozzle 214, where it may be mixed with liquid from storage unit 104, prior to being applied to the surface in need of repair. The specifics of the non-Portland cement based construction material are discussed in further detail herein below.

In some embodiments, the non-Portland cement based construction material described herein may have better strength values as compared to existing materials, a high resistance and no reactivity versus inorganic and organic acids and additionally high early strength values. The material may include a dry mix of blast furnace slag material, geopolymer material, alkali-based powder, and sand at a mixing device to generate the non-Portland cement-based material.

In some embodiments, the non-Portland cement based construction material may include various types of geopolymer material. Some of these may include, but are not limited to, pozzolanic material, which may react with strong alkali and mixing that blend with the sand and/or grit. In some embodiments, the pozzolanic material may include active silicates like slag sand or fly ash. Natural material like volcano rocks or some others may also be used, however, these may be more desirable if used in smaller portions as very fine powder.

In some embodiments, the non-Portland cement based construction material may include any number of pozzolanic materials, some of which may include, but are not limited to finely ground clay, gneiss, granite, liparite, andesite, picrite, potassic feldspar, albite, pumice, zeolite, etc., as well as mixtures thereof. These materials may be used in a ground form, calcinated and/or noncalcinated. Additionally and/or alternatively, all raw materials containing sufficient amounts of reactive (e.g., metastable, vitreous) $SiO_2$ and $Al_2O_3$, including, but not limited to, ashes, puzzolans, slags may also be suitable for embodiments of the present disclosure.

In some embodiments, the non-Portland cement based construction material may include an alkali-based powder material and/or various mixing liquids. Some possible mixing liquids may include, but are not limited to, potassium and sodium water glass, alkali hydroxides, etc.

In some embodiments, the reaction between the $SiO_2$/$Al_2O_3$ containing components and the alkaline mixing liquid may result in alumino-silicates having a tridimensional structure. These framework structures allow for the creation of a construction material requiring no Portland cement in the compound.

In operation, the ingredients may be thoroughly mixed (e.g., wholly or partially at vehicle 100) and then delivered to portable gun 212. The non-Portland cement based construction material may be carried via compressed air through the conduit 216 to nozzle 214. In one particular embodiment, potassium silicate, solid content 48%, density 1.52 g/ml, wt $SiO2:K2O$ 1,14, and some water may be added and thoroughly mixed inside nozzle 214 in a short period of time (e.g., less than 1 second) before the partially liquefied mixture may be pneumatically applied to the surface of interest.

In one particular example, the non-Portland cement based construction material may be comprised of the following mixture:

TABLE 1

1 part ground granulated blast furnace slag
0.13 parts volcano rock flour (alternatively fly ash or a mixture)
0.61 parts potassium silicate, wt 1.14
1.35 parts of sand and/or grit In some embodiments, the components of the mixture may have a Blaine fineness of approximately 3500 cm2/g.

In another example, the non-Portland cement based construction material may be comprised of the following mixture:

TABLE 2

| | Parts |
|---|---|
| Blast furnace slag | 0.5-1 |
| Fly Ash | 0-0.5 |
| Pozzolanic | 0-0.5 |
| Sand/grit | 1-2 |
| Potassium or sodium silicate liquid or powder (wt 1.0-3.5) | 0.2-2 |

In another example, the non-Portland cement based construction material may be comprised of the following mixture:

TABLE 3

| | Recipe 1 parts | Recipe 2 parts | Recipe 3 parts |
|---|---|---|---|
| Blast Furnace Slag GGBS | 1 | 1 | 1 |
| Fly ash | 0.2 | 0.2 | 0.1 |
| Puzzolona volcano ash | 0.2 | | 0.3 |
| Puzzolona pumice stone, grinded | | 0.2 | |
| Dry sodium silicate Wt 2.1, Na2O 27.5% | 0.7 | | |

TABLE 3-continued

| | Recipe 1 parts | Recipe 2 parts | Recipe 3 parts |
|---|---|---|---|
| Potassium silicate SC 52%, density 1.65 g/ml, Wt 1 | | 0.6 | 0.6 |
| Sand | 1.35 | 1.35 | 1.35 |
| Water | 0.55 | | |

Embodiments of the non-Portland cement based construction material produced an unanticipated result as the reaction time of the alkaline ingredients with the rock flour was sufficient to generate a sticky compound. Through numerous tests, this compound was found to adhere extremely well on a vertical surface, builds a tide bonding and hardens within 3 days with compressive strength values above 50 N/mm2 (8000 psi).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for applying a construction material comprising:
    mixing, at a mixing device, slag material, geopolymer material including non-pumice-based volcano rock flour, alkali-based powder, and sand to generate a non-Portland cement-based material;
    connecting a delivery mechanism to the mixing device, the delivery mechanism configured to transport the non-Portland cement-based material from the mixing device to a portable container associated with a portable gun; and
    transporting the non-Portland cement-based material from the portable container to a handheld nozzle, wherein the handheld nozzle is configured to receive the non-Portland cement-based material and combine the transported non-Portland cement-based material with liquid to generate a partially liquefied non-Portland cement-based material.

2. The method of claim 1, wherein the alkali-based powder includes silicate.

3. The method of claim 1, wherein mixing is performed as a dry-mix.

4. The method of claim 1, wherein mixing is performed as a wet-mix.

5. The method of claim 1, wherein the non-Portland cement-based material is inorganic.

6. The method of claim 1, wherein mixing is performed at a mobile sewer refurbishing vehicle.

7. The method of claim 1, wherein the non-Portland cement-based material includes at least one of clay, gneiss, granite, liparite, andesite, picrite, potassic feldspar, albite, pumice and zeolite.

8. The method of claim 6, wherein mixing includes mixing at a portable gun, which is configured to receive the non-Portland cement-based material from the mixing device.

9. The method of claim 1, wherein the components of the non-Portland cement-based material have a Blaine fineness value of approximately 3500 cm2/g.

* * * * *